United States Patent [19]
Klippstein

[11] Patent Number: 5,854,312
[45] Date of Patent: Dec. 29, 1998

[54] AQUEOUS HARDENERS FOR EPOXY RESIN SYSTEMS

[75] Inventor: Achim Klippstein, Duren, Germany

[73] Assignee: Air Products and Chemicals, Inc., Allentown, Pa.

[21] Appl. No.: 687,767

[22] Filed: Jul. 26, 1996

Related U.S. Application Data

[63] Continuation of Ser. No. 325,244, Dec. 19, 1994, abandoned.

[30] Foreign Application Priority Data

Apr. 21, 1992 [EP] European Pat. Off. ............. 92201096

[51] Int. Cl.$^6$ ................................ C08K 3/20; C08L 63/02
[52] U.S. Cl. .......................... 523/404; 523/409; 564/475
[58] Field of Search ..................... 523/404, 409; 564/474, 475, 476, 477, 478

[56] References Cited

U.S. PATENT DOCUMENTS

| 4,022,946 | 5/1977 | Cummings | 428/413 |
|---|---|---|---|
| 4,269,742 | 5/1981 | Goeke et al. | 528/96 |
| 4,352,898 | 10/1982 | Albers | 523/414 |
| 4,569,971 | 2/1986 | Sasse et al. | 525/109 |
| 5,096,556 | 3/1992 | Corrigan et al. | 204/181.7 |
| 5,204,385 | 4/1993 | Naderhoff | 523/417 |

FOREIGN PATENT DOCUMENTS

| 0000605 | 2/1976 | European Pat. Off. . |
|---|---|---|
| 0003479 | 8/1979 | European Pat. Off. . |
| 0103908 | 3/1984 | European Pat. Off. . |
| 0387418 | 9/1990 | European Pat. Off. . |
| 2361671 | 6/1974 | Germany . |
| 1162076 | 1/1995 | Germany . |
| 5823823 | 7/1981 | Japan . |

OTHER PUBLICATIONS

European Search Report dated Dec. 4, 1992.
International Search Report dated Jun. 29, 1993.

*Primary Examiner*—Melvyn I. Marquis
*Assistant Examiner*—D. Aylward
*Attorney, Agent, or Firm*—Michael Leach; William F. Marsh

[57] ABSTRACT

Described are aqueous emulsions of active amino groups-displaying epoxide adduct hardeners for curing epoxy resin systems, which are obtained by converting an aqueous solution of a conventional hardener, which contains reactive amino groups and can emulsify the epoxy resin used for adduct formation, under increase of the amine-H-equivalent weight, to an emulsion by mixing with an epoxy resin having a functionality of 1,2–3,5. The viscosity generally is 5 to 40 Pa.s. The values lie on an emulsion viscosity curve with a rising and falling viscosity profile. The hardeners are especially suitable for curing aqueous epoxy resin systems and for application together with epoxy resins as additive for hydraulic binders such as cement.

20 Claims, 1 Drawing Sheet

AQUEOUS HARDENERS FOR EPOXY RESIN SYSTEMS

This application is a continuation of application Ser. No. 08/325,244 filed on 1 Dec., 1994, abandoned.

FIELD OF THE INVENTION

The invention relates to aqueous hardeners in the form of aqueous emulsions of active amino groups-displaying epoxy resin adducts, such as polyamide-amine epoxide adducts or polyamine epoxide adducts and the like, their preparation, and the use of same in curing epoxy resin systems.

BACKGROUND OF THE INVENTION

Epoxy resins have long been known; it is a question, in that case, of condensation products of epoxide compounds and polyvalent alcohols or phenols which on account of their comparatively low molecular weight still require curing. To this end use is made of compounds capable of cross-linking the epoxy resin, i.e., which have at least two active points in the molecule. Particular mention is to be made here of compounds having two or more active hydrogen atoms such as polyamines and corresponding polyamide-amines, as well as dicarboxylic acids, cyclic dicarboxylic anhydrides, and the like.

BACKGROUND OF THE INVENTION

Such hardeners have been described in numerous patent specifications and technical literature articles and are commercially available in the market.

Also known are hardeners which are obtained by the adduction of epoxides or epoxy resins to corresponding substances having active hydrogen atoms and which as adducts, moreover, have sufficiently active amino groups to make the curing of epoxy resins into the end product possible.

Such adduct hardeners are described in, int. al., German Published Application 2 361 671. These hardeners are obtained by reacting an excess of polyamide-amine or polyamine with an epoxy resin. For the curing process these adducts are either first of all dissolved as such in water and mixed with a solution or dispersion of another polymer and then added to the epoxide to be cured, or mixed directly with the dissolved or dispersed further polymer without previous dissolving. Besides other shortcomings such as long drying times and insufficient chemical resistance, an essential drawback to this process in many cases is the fact that in addition to the hardener and the epoxy resin to be hardened there must always be a third polymer component which, furthermore, is not reactive.

In European Patent Application 605 (U.S. Pat. No. 4,197, 389) similar adduct hardeners are described, which are composed of three elements, viz. a polyepoxide compound, a polyalkenyl polyether polyol, and a polyamine. This conversion product preferably is further reacted with a mono-unsaturated compound, the adduct may be diluted with water beforehand.

Another hardener for epoxide compounds is described in European Patent Application 387 418 (U.S. Pat. No. 5,032, 629). In this case polyalkylene polyether monoamines or polyalkylene polyether diamines or polyalkylene polyether polyamines are reacted with corresponding epoxide compounds. Following a further reaction with amines this intermediate product may be dispersed or dissolved in water and then applied as an emulsion, suspension, or solution.

Aqueous emulsions of hardeners based on adducts of epoxides and amine compounds are also described in laid-open Japanese Patent Application 58-23823. The amine compounds in question are water-insoluble or poorly water-soluble compounds, e.g. long-chain alkylamines or modified ethylene diamine.

Although a wide range of hardeners for curing epoxy resin systems, especially aqueous epoxy resin systems, is already known, there is still need for improved hardeners of this kind, as well as for processes to prepare them.

SUMMARY OF THE INVENTION

It is therefore the object of the invention to provide aqueous hardeners for curing epoxy resin systems, more particularly aqueous systems, which stand out for low toxicity, favourable curing behaviour, also at low temperatures, reduced drying times when applying the hardener/epoxy resin system, and other advantages.

This object is attained by means of a process for the preparation of aqueous emulsions of active amino groups-displaying epoxide adduct hardeners for curing epoxy resin systems, characterised in that an aqueous solution of a conventional hardener, which contains reactive amino groups and can emulsify the epoxy resin used for adduct formation, under increase of the amine-H-equivalent weight, optionally after further dilution with water, is converted to an emulsion by mixing and conversion with an epoxy resin having a functionality of 1.2–3.5. Preferably, for the formation of adducts use is made of epoxy resins having an average molecular weight of at least 700. It is expedient to carry out the mixing and conversion with vigorous stirring. It is of advantage to employ dissolved hardeners having an amine-H-equivalent weight of 50 to 250. The amine-H-equivalent weight advantageously is raised by 10 to 250. It is of advantage to set the emulsion at a viscosity of 5 to 40 Pa.s, measured on a 50%-emulsion. In an especially advantageous embodiment of the process according to the invention, use is made of solutions of Mannich bases, especially transaminated Mannich bases. In a further especially advantageous embodiment of the process according to the invention, use is made of a dissolved hardener and an epoxy resin, which lead to adduct emulsions of which the viscosities display an emulsion viscosity curve with a rising and falling viscosity profile. The subject matter of the invention further includes the correspondingly obtainable aqueous hardeners and their application in the curing of epoxy resin systems, more particularly aqueous epoxy resin systems.

From the emulsions obtained according to the invention water and optionally present other, especially volatile, constituents such as co-solvents may be extracted wholly or in part, preferably by means of spray drying.

The hardeners according to the invention also can advantageously be used together with epoxide resins as additive for hydraulic binders, more particularly cement.

DETAILED DESCRIPTION OF THE INVENTION

Figure 1:
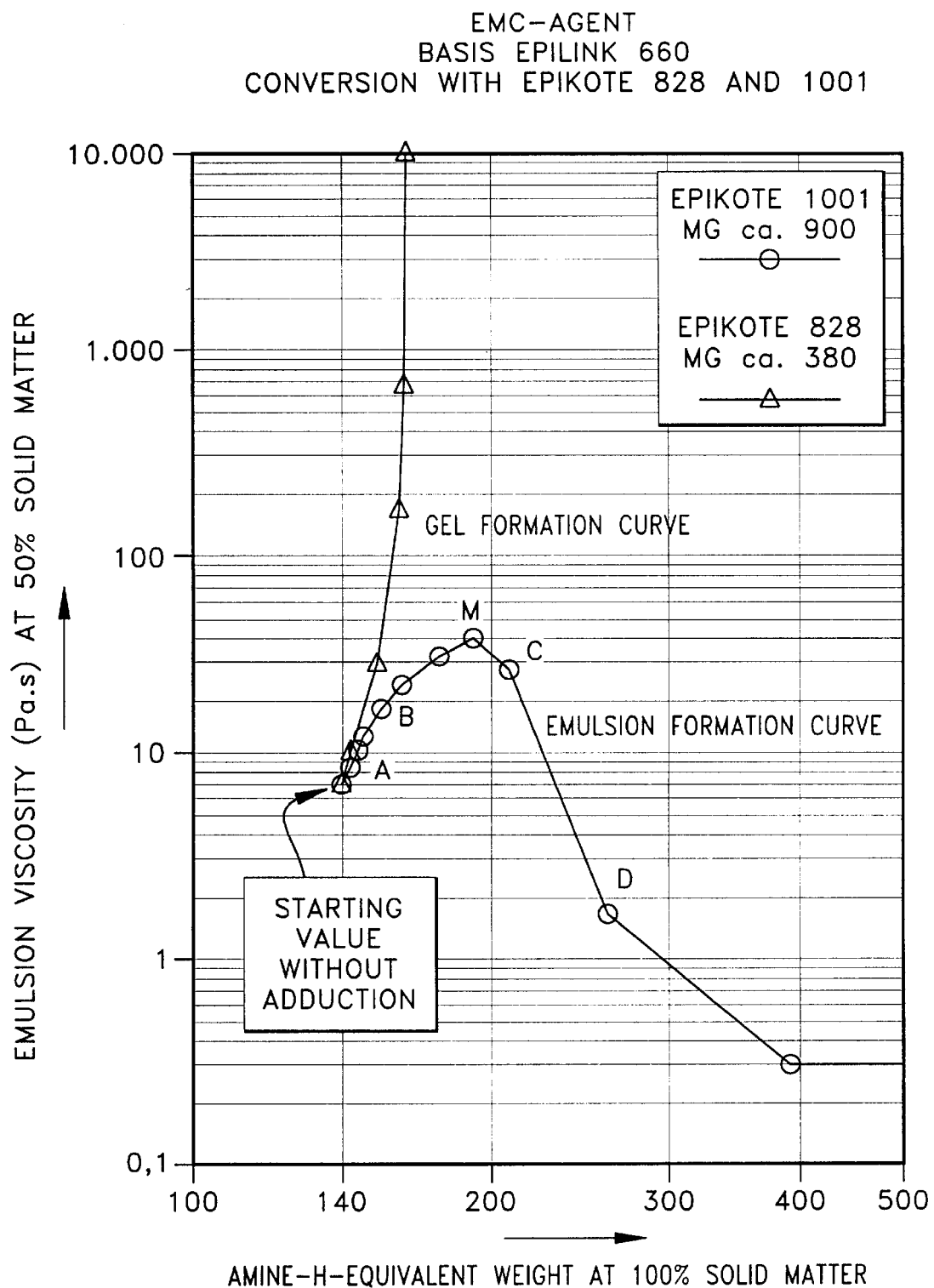
FIG. 1 compares the rising and falling viscosity profile of an aqueous hardener emulsion prepared according to the invention with the rising viscosity profile of an aqueous hardener emulsion outside the invention.

To carry out the process according to the invention use is made of active amino groups-displaying hardeners for epoxy resin systems, for instance commercially available products. These must be available as an aqueous solution, i.e., the actual hardener forms a real or colloidal solution with water. These solutions may be prepared by simple dissolving in water. Frequently, such solutions also are already commercially available as such. These genuine solutions appear to the naked as well as to the aided eye (under the microscope) to be completely clear. This is frequently the case up to a particle size of about 0.001 $\mu$m. Corresponding colloidal solutions having a particle size of up to about 1 $\mu$m also appear to be homogeneous still, but they display the so-called Tyndall effect. These solutions distinguish themselves from coarsely dispersed systems.

It goes without saying that the particle size data given above should serve solely as a guiding principle and that the boundaries between the three ranges may be fluid and differ from hardener to hardener.

The aqueous solution of the hardener may contain further additives, e.g. emulsifiers, which serve to emulsify the epoxy resin to be cured, acids, cosolvents, and other conventional additives.

Within the framework of the invention use may also be made of hardeners which are water-insoluble per se and will form only coarsely dispersed systems, viz. suspensions or emulsions, with water as such, provided that they can be brought to solution by the addition of other substances, for instance an acid, more particularly an organic acid, or other means.

Highly suitable for use are hardeners known as polyamide-amines, especially condensation products based on polyamines such as diethylene triamine and monomers, dimerised and trimerised fatty acids or derivatives thereof, e.g. the polycondensation product of dimerised soybean fatty acid methyl ester and diethylene triamine.

Also highly suitable are products on the basis of phenols, formaldehyde, amines which are prepared in accordance with a Mannich condensation process. For the preparation of such condensation products reference is made to, int. al., DE-AS 1 162 076, according to which polyvalent aliphatic amines, mono- or polyvalent phenols, and aldehydes are reacted with each other.

The transamination of these and other Mannich bases is described in EP-PS 3 479 (U.S. Pat. No. 4,269,742), in which a wide range of other hardeners is also enumerated. The disclosure in this patent specification is explicitly referred to. Within the framework of the invention it is especially advantageous to use solutions of transaminated Mannich bases as hardener.

As examples of commercially available hardeners that may be used as solution within the framework of the invention are to be mentioned: Epilink 360 polyaminoamine, Epilink 375, Epilink 660 amine adduct (trade name of Akzo Chemicals GmbH, Düren), Euredur XE-38 polyamine adduct (trade name of Schering AG, Berlin), Beckopox EH623 aliphatic polyamine (trade name of Hoechst AG, Frankfurt am Main), Jeffamine polyoxyalkylenediamine (trade name of Texaco Chemical Comp., Houston, Tex., USA), provided that they have more than one active amino group per molecule.

To carry out the process according to the invention use is made of conventional reactive amino groups-displaying hardeners, which frequently are already commercially available as aqueous solution and may further be diluted with water if so desired. If the hardeners are not yet available in solution, they are converted to an aqueous solution, optionally with the addition of solution promoting means, e.g. an organic acid. The concentration of the hardeners in the aqueous solution may vary within comparatively wide limits, e.g. from 10 to 80 wt. %; it is expedient, however, to adapt the concentration to its later use already when preparing the emulsion. For many applications it is advantageous to so set the concentration that after conversion to an emulsion by addition of the permitted epoxy resin, an aqueous hardener system with about 50 wt. % of dry substance, i.e. anhydrous material, is formed.

After that, epoxy resin which has a functionality of 1.2 to 3.5 is added, with care being taken to obtain proper mixing. The epoxy resin is conveniently added in the liquid form, either because, say, it is liquid to start with, or because it is dispersed in water. The amount of epoxy resin is so adjusted that after the addition an emulsion is available, and the adduct has the number of active amino groups required for the later curing process. The addition of the epoxide is best carried out batchwise or continuously over a set period of time, e.g. within 5 to 20 minutes, after which the temperature may be increased, e.g. to 80° C., and after-stirring may take place for some time. Alternatively, the temperature may be raised prior to the epoxide being added.

Care should be taken to see to it that the addition of the epoxide proceeds in such a way that the epoxide is not dissolved but emulsified by the available hardener solution. For, if on account of, say, too slow epoxide adding a solution is formed first, there is a grave risk of adducts with unserviceably high viscosities being formed.

After that, the emulsion is cooled and either used directly for curing or packed or stored. Alternatively, it is possible to first wholly or partially remove the water from the emulsion, especially by means of spray drying, and this is also the case for optionally present other substances such as volatile cosolvents and the like, and to use the concentrated or dehydrated product at a later time, optionally after the addition of water and other additives.

It is of importance for the hardener solution used to form an aqueous emulsion with the added epoxy resin, there should be no gelling. To this end, advantageous use is made of epoxy resins having an average molecular weight (weight average) of at least 700.

Surprisingly, it was found that the process according to the invention may lead to aqueous hardener emulsions which, depending on the amount of epoxy resin employed, display a special viscosity profile. For if according to the invention, starting from a hardener solution, an adduct emulsion is prepared by reaction with a corresponding epoxy resin, e.g. a 50%-emulsion, then depending on the amount of epoxy resin added, i.e., depending also on the increase in molecular weight or the increase in amine-H-equivalent weight, the viscosity values of such 50%-emulsions are always at one point in a typical curve, as is depicted in FIG. 1. Thus, depending on the adducted amount of epoxy resin, the low viscosity of the solution first rises but still remains within a very low viscosity range, and then, after reaching a maximum (M), which likewise is in a range of low viscosities, preferably below 50 mPa, falls again. This type of curve is defined within the framework of the invention as an emulsion viscosity curve with a rising and falling viscosity profile. The preparation of such emulsions is preferred within the framework of the invention. With the aid of the viscosity profile it is possible to select suitable systems by means of a few routine tests. Preferably, the emulsions prepared according to the invention have viscosities which are on the curve path ABMCD of the viscosity profile. In such a case, point A corresponds to a viscosity for an emulsion where the amine-H-equivalent weight of the presented hardness was increased by 10; B is a random point between A and the maximum M, C is a random point between M and D, D is the value from which the fall in viscosity is reduced again as the amine-H-equivalent weight increases, i.e., at which the curve starts to flatten out.

Such a curve is set up as follows. An aqueous solution of the hardener to be used is made available and to it is added an amount of epoxide which is sufficient, int. al., to increase the amine-H-equivalent weight by about 10. In the same way, again always making use of a corresponding hardener solution, emulsions of a higher HEW are prepared, and each time the viscosity of the emulsion obtained in adduct forming is determined.

Within the framework of the invention the amine-H-equivalent weight means the equivalent weight calculated on active hydrogen-displaying amino groups. Unless indicated otherwise, it is a question of the equivalent weight calculated on dry substance. The value sometimes calculated on the supply form (aqueous solution, for instance) by suppliers can easily be converted on the basis of the concentration specifications.

The aqueous hardener emulsions according to the invention can be used directly for curing epoxy resins. The epoxy resins to be cured may be utilised in, say, the liquid form without solvent or dispersing liquid. Especially advantageously, however, use is made of aqueous dispersions of epoxy resins, either as suspension or as emulsion.

For the forming of adducts on the one hand and the later curing on the other the same epoxy resins may be selected; alternatively, different epoxy resins may be selected for forming the adduct and emulsion, and for curing. These epoxy resins are known in themselves. Quite generally, it is a question of compounds which have more than one epoxide function in the molecule. Mostly, they are prepared by reaction of an epihalohydrin such as epichlorohydrin with a polyfunctional compound such as diphenols, e.g. bisphenol-A, aliphatic diols, etc. An enumeration of such compounds is to be found, int. al., in already cited documents such as EP-OS 387 418 (U.S. Pat. No. 5,032,629), JP-OS 83/23823, EP-OS 605 (U.S. Pat. No. 4,197,389).

The emulsions according to the invention offer a whole range of in part wholly unexpected advantages. Thus, the substantially reduced drying times would not have been expected. The required strengths and chemical resistance are set more rapidly and have been enhanced. On account of their outstanding properties, the hardeners are excellently processable with virtually all epoxy resins. Since they are comparatively unsusceptible to variations of the formula and changes in the processing conditions, they allow for secure and reproducible working.

They are highly suitable for the preparation of high-solid systems. The hardeners according to the invention can be employed in all conventional areas which require the curing or cross-linking of epoxy resins, i.e., for instance, for the preparation of coating compositions, coatings, coverings, sealants and adhesives, for the preparation of flexible shaped articles, flat shaped articles, and laminates.

The hardeners according to the invention may be employed with particular advantage together with epoxy resins as additive for hydraulic binders such as cement.

The conventional hardeners as a rule also contain so-called free amines, by which are meant low-molecular weight amines such as ethylene diamine, diethylene triamine, and so on, which in part may still arise from the preparation of the polyamide-amine, but in part may also be deliberately added in order to accelerate the curing process. These amines are mostly toxic, corrosive substances, as a result of which such hardeners are subject to special compulsory identification.

The hardeners according to the invention do not require such additives as they react sufficiently quickly of their own accord, so they are very environment-friendly. Since it is possible according to the invention to reduce the free amine content to below 1%, compulsory identification frequently does not apply.

The invention will be further illustrated with reference the following examples.

Preparation Specification (Corresponds to Example 8 in the Table)

Into a 1 l glass flask were charged 423 g of Epilink 660 epoxide hardener and diluted, with stirring, with 205 g of completely softened water. To this hardener solution 72 g of Epikote 1001 PM 75 diglycidylether of bisphenol A epoxy resin solution were then continuously added dropwise over 5 minutes at a temperature of 50° C. The rate of stirring was set such that vigorous mixing resulted, without air being stirred in.

After the addition the temperature was raised steadily from 50° to 80° C. over 30 minutes. This temperature was maintained for an after-stirring period of 60 minutes. The resulting emulsion was cooled to 30° C. with stirring and drawn off.

The thus prepared emulsion had a viscosity of 25 Pa.s (20° C.) with a solids content of 50% and a natural colour of pale yellow. The amine-H-equivalent weight was 175. So the following change was made: the amine-H-equivalent weight of Epilink 660 epoxy hardener, which is 140 at 100% dry substance, in Example 8 was 175 at 100% dry substance, hence it was increased by 35 units or 25%, calculated on the dry substance.

The test applying the technique showed a very marked improvement of some properties as compared with unmodified Epilink 660 epoxy hardener. As reaction component for the hardener of the example and Epilink 660 epoxy hardener Eurepox 776 liquid epoxy resin (Schering AG) was used. After the resin and the hardener component had been mixed, a 50% overall substance was set using water. All tests were carried out in a normal climate of 20° C. and 65% humidity.

| Table/Results | | | |
|---|---|---|---|
| | equivalent weight | | |
| according to the invention hardener (no. 8) | =175 | 48,0 g | — |
| Epilink 660 | =140 | — | 30,3 |
| Eurepox 776 | =190 | 26,0 g | 28,8 |
| completely softened water | % | 26,0 g | 40,9 |
| | 100,0 g | 100,0 | |
| solids content | | 50% | 50% |
| processing time (hours) | | 2 | 2 |
| drying time (hours) | | 5 | 12 |
| phase 4 BK recorder impact hardness (Persoz) | | | |
| age of samples 24 hours | | 175 | 95 |
| 48 hours | | 270 | 180 |
| 7 days | | 350 | 310 |
| 1 month | | 380 | 370 |
| resistance to acetone reached after . . . days | | 2 | 7 |

In the same way adducts were prepared according to the specifications in the table. It is obvious that in the case of systems which do not form emulsions the viscosity rises very sharply and gelling occurs very quickly. With the exception of Example 1, the amounts were so calculated as to give a 50 wt. % emulsion.

TABLE

| raw material | Type | Techn. Solid matter | data[5] equivalent weight | Supplier | Examples of emulsion forming 0 | 1 | 2 | 3 | 4 | 5 | 6 |
|---|---|---|---|---|---|---|---|---|---|---|---|
| Jeffamine D230 | EP-Hardener | 100 | 60 | Texaco | 17.9 | | | | | | |
| EPILINK 360[1] | " | 50 | 210 | Akzo | | 38.0 | | | | | |
| EPILINK 375[1] | " | 60 | 230 | " | | | 63.0 | | | | |
| EPILINK 660[1] | " | 70 | 200 | " | | | | | | 60.1 | 60.1 |
| Euredur XE 38[1] | " | 80 | 200 | Scherin | | | | 41.6 | | | |
| Beckopox EH 623[1] | " | 80 | 150 | Hoechst | | | | | 52.0 | | |
| Beckopox EP-384[2] | EP-resin | 53 | 1,000 | Hoechst | 61.1 | 12.0 | 23.5 | 31.2 | 14.0 | 15.0 | |
| Epi-Res WY 5522[2] | " | 53 | 1,200 | Hitek | | | | | | | 14.4 |
| Water | Diluent | | | | 22.0 | 50 | 13.5 | 26.2 | 32.3 | 24.9 | 25.5 |
| Disponil 23 | emulsifier | | | Henkel | 0.6 | | | 1.0 | | | |
| Boric acid | | | | Merck | | | | | 1.7 | | |
| techn. data of the reaction products | | | Solid matter viscosity | % Pa·s 20° C. | 50 0.5 | 25 >300 | 50 220 | 50 8 | 50 100 | 50 25 | 50 20 |
| amine-H-equivalent calculated on 100% solid matter | | | of starting hardener reaction product increase in HEW by % | | 60 200 234 | 105 150 43 | 138 200 45 | 120 200 67 | 160 200 25 | 140 175 25 | 140 175 25 |

| raw material | Type | Techn. Solid matter | data[5] equivalent weight | Supplier | Examples of no emulsion forming 7 | 8 | 9 | 10 | 11 | 12 |
|---|---|---|---|---|---|---|---|---|---|---|
| EPILINK 660[1] | EP-Hardener | 70 | 200 | Akzo | 60.1 | 60.4 | 69.2 | 66.3 | 65.8 | 65.2 |
| DOW XZ 92400.00[3] | EP-resin | 85 | 425 | Dow | | | | | | |
| Epikote 1001 PM 75[3] | " | 75 | 600 | Shell | | 10.3 | | | | |
| Epikote 828[4] | " | 100 | 190 | Shell | | | 2.3 | 3.6 | 3.9 | 4.4 |
| Water | Diluent | | | | 30.4 | 29.3 | 29.5 | 30.1 | 30.3 | 30.4 |
| Techn. data of the reaction products | | | Solid matter viscosity | % Pa·s 20° C. | 50 >300 | 50 23 | 50 28 | 50 170 | 50 700 | 50 gelled |
| amine-H-equivalent calculated on 100% solid matter | | | of starting hardener reaction product increase in HEW by % | | 140 175 25 | 140 175 25 | 140 152 8.6 | 140 160 14.3 | 140 162 15.7 | 140 163 16.4 |

[1] optically clear solutions in water
[2] aqueous emulsions
[3] epxoy resin solution in Dowanol PM
[4] 100%-liquid epoxy resin
[5] calculated on the supply form

I claim:

1. A process for the preparation of a storage stable aqueous emulsion of an active amino group-containing hardener adduct for curing epoxy resin systems which comprises sufficiently mixing (a) an epoxy resin in liquid form having an epoxy functionality of 1.2 to 3.5 and a weight average molecular weight of at least 700 and (b) an aqueous solution of an active amino group-containing hardener which disperses the epoxy resin as the adduct to yield an aqueous emulsion of a hardener adduct having an increased amine-H-equivalent weight.

2. The process of claim 1 in which the epoxy resin is added to the aqueous hardener solution.

3. The process of claim 1 in which the hardener in solution has an amine-H-equivalent weight of 50 to 250.

4. The process of claim 1 in which the hardener adduct emulsion has a viscosity of 5 to 40 Pa.s at 50% solids.

5. The process of claim 1 in which the amount of epoxy resin is sufficient to raise the amine-H-equivalent weight of the hardener by 10 to 250 by its adduction with the epoxy resin.

6. The process of claim 1 in which the epoxy resin is added to the aqueous hardener solution over a period of about 5 to 20 minutes.

7. The process of claim 1 in which the epoxy resin is added to the aqueous hardener solution over a period of about 5 minutes.

8. The process of claim 1 in which the dissolved hardener is an amine adduct, a polyamine adduct, an aliphatic polyamine, a polyoxyalkylenediamine, a polyamidoamine; a Mannich base formed by the condensation of a phenol, an amine and formaldehyde; a transaminated Mannich base, or mixtures thereof.

9. The process of claim 1 in which the dissolved hardener is an amine adduct and the epoxy resin is a diglycidyl ether resin of bisphenol A.

10. The process of claim 1 in which a dissolved hardener and an epoxy resin are employed which lead to an adduct emulsion whose viscosity displays an emulsion viscosity curve with a rising and falling viscosity profile.

11. The process of claim 1 in which water and other volatile constituents, if present, are extracted wholly or in part from the aqueous emulsion prior to use in curing of an epoxy resin and/or for storage and transport.

12. The process of claim 11 in which the aqueous emulsion is subjected to spray drying.

13. A process for the preparation of a storage stable aqueous emulsion of an active amino group-containing hardener adduct for curing epoxy resin systems which comprises converting an aqueous solution of an active amino group-containing hardener, which emulsifies the epoxy resin used for adduct formation, to an adduct emulsion by mixing with an epoxy resin having an epoxy functionality of 1.2 to 3.5 and a weight average molecular weight of at least 700, the epoxy resin being mixed with the aqueous hardener solution in liquid form, sufficiently fast and in an amount such that the epoxy resin is emulsified by the hardener solution as the adduct, the adduct having the number of active amino groups required for the curing process and an amine-H-equivalent weight increased by 10 to 250, and yielding a hardener adduct emulsion having a viscosity of 5 to 40 Pa.s at 50% solids.

14. The process of claim 13 in which the epoxy resin is added to the aqueous hardener solution.

15. The process of claim 13 in which the dissolved hardener has an amine-H-equivalent weight of 50 to 250.

16. The process of claim 14 in which the epoxy resin is added to the aqueous hardener solution over a period of about 5 to 20 minutes.

17. The process of claim 14 in which the epoxy resin is added to the aqueous hardener solution over a period of about 5 minutes.

18. The process of claim 13 in which the dissolved hardener is an amine adduct, a polyamine adduct, an aliphatic polyamine, a polyoxyalkylenediamine, a polyamidoamine; a Mannich base formed by the condensation of a phenol, an amine and formaldehyde; a transaminated Mannich base, or mixtures thereof.

19. The process of claim 13 in which the dissolved hardener is an amine adduct and the epoxy resin is a diglycidyl ether resin of bisphenol A.

20. The process of claim 14 in which the dissolved hardener is an amine adduct and the epoxy resin is a diglycidyl ether resin of bisphenol A.

* * * * *